United States Patent
Hara (10) Patent No.: US 10,436,262 B2
(45) Date of Patent: Oct. 8, 2019

(54) CONTROL DEVICE FOR POWER TRANSMISSION MECHANISM

(71) Applicant: Honda Motor Co., Ltd., Tokyo (JP)

(72) Inventor: Tetsuro Hara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 400 days.

(21) Appl. No.: 15/472,284

(22) Filed: Mar. 29, 2017

(65) Prior Publication Data
US 2017/0284486 A1 Oct. 5, 2017

(30) Foreign Application Priority Data
Mar. 30, 2016 (JP) ................... 2016-068790

(51) Int. Cl.
*F16D 48/06* (2006.01)
*B60K 23/08* (2006.01)
(Continued)

(52) U.S. Cl.
CPC ............ *F16D 48/066* (2013.01); *B60K 23/08* (2013.01); *F16D 13/52* (2013.01); *F16D 25/0638* (2013.01); *F16D 25/14* (2013.01); *B60K 2023/0866* (2013.01); *F16D 2500/1045* (2013.01); *F16D 2500/10431* (2013.01); *F16D 2500/3108* (2013.01); *F16D 2500/3109* (2013.01); *F16D 2500/3111* (2013.01); *F16D 2500/3127* (2013.01)

(58) Field of Classification Search
CPC ......... F16D 48/066; F16D 2500/10431; F16D 2500/3111
See application file for complete search history.

(56) References Cited

U.S. PATENT DOCUMENTS

| | | | |
|---|---|---|---|
| 5,769,752 A * | 6/1998 | Kim .................. | F16D 48/066 477/114 |
| 2008/0125284 A1* | 5/2008 | Tanaka ............... | F16D 48/066 477/39 |
| 2011/0251767 A1* | 10/2011 | Tsutsui .............. | F16D 48/066 701/67 |

FOREIGN PATENT DOCUMENTS

| | | |
|---|---|---|
| JP | 2004338685 | 12/2004 |
| JP | 2005083464 | 3/2005 |
| JP | 2012-224290 | 11/2012 |

OTHER PUBLICATIONS

"Office Action of Japan Counterpart Application", dated Jan. 24, 2017, with English translation thereof, p. 1-p. 6.

* cited by examiner

*Primary Examiner* — Edwin A Young
(74) *Attorney, Agent, or Firm* — JCIPRNET (57) ABSTRACT

A control device for a power transmission mechanism is provided, performing control so that a driving wheel reliably obtains torque when a vehicle is started. In a vehicle having a power transmission mechanism that includes a power transmission path transmitting power from a power source to a first driving wheel and a second driving wheel, and a power transmission element arranged in the power transmission path between the power source and the second driving wheel, a control device for a power transmission mechanism includes a control section controlling a fastening force of the power transmission element so as to control power transmission capacity of the power transmission mechanism from the power source to the second driving wheel, wherein when the control section acquires that the vehicle transitions from a traveling state to a stop state, the acquisition triggers the control section to increase the power transmission capacity.

8 Claims, 4 Drawing Sheets

(51) Int. Cl.
*F16D 13/52* (2006.01)
*F16D 25/0638* (2006.01)
*F16D 48/02* (2006.01)

FIG. 5 even if the control section (50) issues to the hydraulic
CONTROL DEVICE FOR POWER TRANSMISSION MECHANISM

CROSS-REFERENCE TO RELATED APPLICATION

This application claims the priority benefit of Japan application no. 2016-068790, filed on Mar. 30, 2016. The entirety of the above-mentioned patent application is hereby incorporated by reference herein and made a part of this specification.

BACKGROUND OF THE INVENTION

Field of the Invention

The invention relates to a control device for a power transmission mechanism, the power transmission mechanism transmitting power from a power source to a driving wheel of a vehicle.

Description of the Related Art

Conventionally, a power transmission mechanism transmits power from a power source such as an engine or the like to all driving wheels of a vehicle. In such power transmission mechanism, a clutch for front-rear torque distribution transmits the power from a driving source attached to the front wheel side to the rear wheel side (e.g., see Patent Document 1). A four-wheel-drive electronic control unit (4WD•ECU) as a control device for controlling power transmission capacity is attached to the power transmission mechanism.

When hydraulic clutch type front-rear torque distribution is performed, differential rotation does not occur in the clutch, the torque cannot be transmitted. Torque responsiveness depends on an actuator and clutch differential rotation. Hence, there is a problem that, if the control device issues a standby command to the clutch for front-rear torque distribution after the vehicle stops or when the vehicle is started, although hydraulic responsiveness is improved, the torque responsiveness is not improved.

PRIOR-ART DOCUMENTS

Patent Documents

Patent Document 1: Japanese Patent Publication No. 2012-224290

SUMMARY OF THE INVENTION

Problems to be Solved by the Invention

The invention is made in view of the above points and provides a control device for a power transmission mechanism, wherein control is performed so that a driving wheel reliably obtains power when a vehicle is started.

Means for Solving the Problems

To solve the above problems, in a vehicle (1) having a power transmission mechanism (8) that includes a power transmission path (10) transmitting power from a power source (3) to a first driving wheel (W1, W2) and a second driving wheel (W3, W4), and a power transmission element (20) arranged in the power transmission path (10) between the power source (3) and the second driving wheel (W3, W4), a control device (60) for a power transmission mechanism according to the invention is characterized by including a control section (50) controlling a fastening force of the power transmission element (20) so as to control power transmission capacity of the power transmission mechanism (8) from the power source (3) to the second driving wheel (W3, W4), wherein when the control section (50) acquires that the vehicle (1) transitions from a traveling state to a stop state, the acquisition triggers the control section (50) to increase the power transmission capacity.

In this way, when it is acquired that the vehicle (1) transitions from the traveling state to the stop state, the acquisition triggers an increase in power transmission capacity. Accordingly, on a slope or the like where power is required in starting the vehicle (1), the driving wheels can reliably obtain torque immediately after the start of the vehicle (1).

In addition, the control device (60) for a power transmission mechanism is characterized by including a velocity information acquisition section (VS) acquiring velocity information of the vehicle (1), wherein when the vehicle (1) decelerates, if the velocity information acquisition section (VS) acquires a velocity equal to or less than a first velocity (V1), the power transmission element (20) is fastened. In this way, by performing control using the velocity of the vehicle (1) as a parameter, the control becomes easy.

In addition, the control device (60) for a power transmission mechanism is characterized by including an acceleration information acquisition section (AS) acquiring acceleration information of the vehicle (1), wherein when the control section (50) acquires that a value of the acceleration information acquisition section (AS) is equal to or less than a threshold acceleration (A1) after a predetermined time (t1) has passed since acquisition of a second velocity (V2) lower than the first velocity (V1), the power transmission element (20) is unfastened.

In this way, by setting the second velocity (V2) as a vehicle velocity immediately before stop, and acquiring an acceleration equal to or less than the threshold acceleration (A1) after the predetermined time (t1) has passed since the second velocity (V2) is reached, an acceleration value in a state immediately after stop can be acquired. In addition, when the value of the acceleration information acquisition section (AS) is equal to or less than the threshold acceleration (A1), by unfastening the power transmission element (20), the power transmission capacity is suppressed from being increased more than necessary.

In addition, in the control device (60) for a power transmission mechanism, the power transmission element (20) is configured to be fastened or unfastened by oil pressure of operating oil supplied from a hydraulic circuit (30), and the control section (50) controls the oil pressure supplied from the hydraulic circuit (30) to the power transmission element (20).

Herein, when the power transmission element (20) is operated using the hydraulic circuit (30), after the vehicle (1) stops, even if the control section (50) issues to the hydraulic circuit (30) a command to generate driving torque to fasten the power transmission element (20), hydraulic responsiveness remains increasing. That is, when the vehicle (1) is started, since differential rotation occurs in the power transmission path (10) in order to transmit the driving torque, transmission responsiveness of the driving torque is somewhat delayed. However, according to the above configuration, even if the power transmission element (20) is operated using the hydraulic circuit (30), it is possible to increase the power transmission capacity of the power transmission element (20) before the vehicle (1) stops. Hence, on a slope or the like where power is required in starting the vehicle (1), the driving wheels can reliably obtain torque immediately after the start of the vehicle (1).

In addition, in the control device (60) for a power transmission mechanism, when the control section (50) acquires that an inclination of a road surface (R) is equal to or greater than a predetermined value, the control section (50) performs control to inhibit unfastening of the power transmission mechanism (20). In this way, the control can also be performed using the road surface inclination as a parameter.

In addition, in the control device (60) for a power transmission mechanism, when the control section (50) acquires that the road surface (R) in front of the vehicle (1) inclines so as to be higher by a predetermined value or more than the road surface (R) behind the vehicle (1), the control section (50) performs control to inhibit unfastening of the power transmission mechanism (20). In this way, in cases where the vehicle (1) moves forward on an uphill road, and so on, that the road surface (R) in front of is higher by a predetermined value or more than the road surface (R) behind the vehicle (1) is used as a parameter.

Moreover, the above reference numerals in parentheses are shown as one example of the invention to indicate reference numerals of corresponding components of a later-described embodiment.

Effects of the Invention

According to the control device for a power transmission mechanism according to the invention, control can be performed so that the driving wheel reliably obtains torque when the vehicle is started.

DESCRIPTION OF THE EMBODIMENTS

Figure 1:
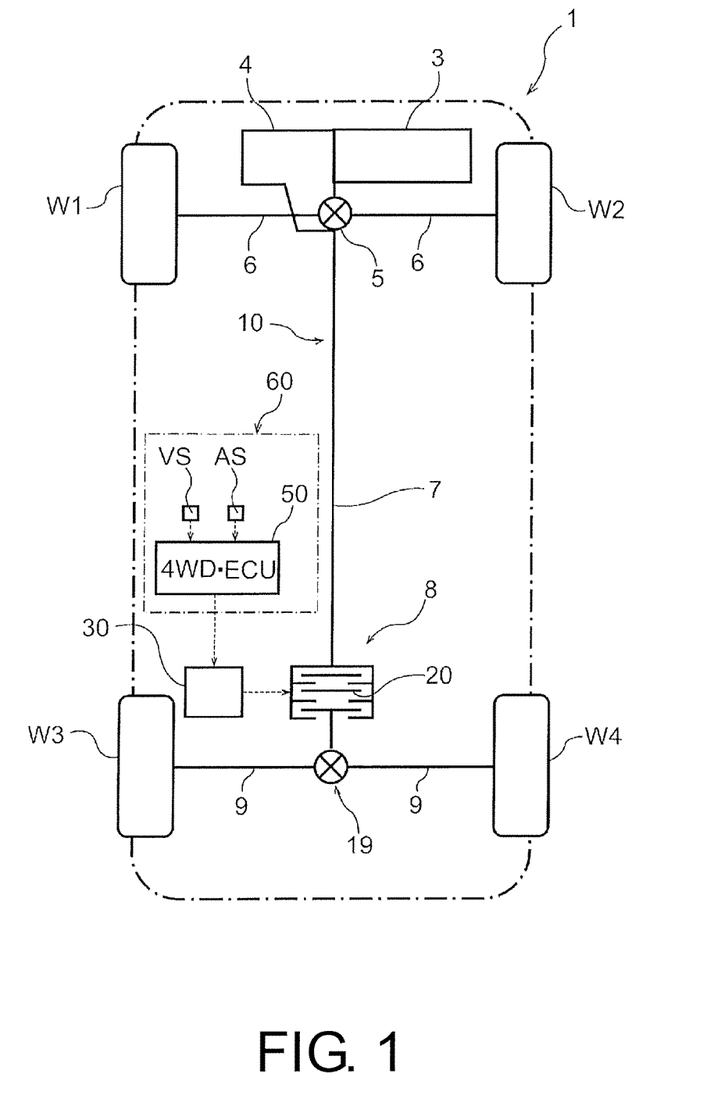
FIG. 1 shows a schematic configuration of a four-wheel-drive vehicle including a control device for a power transmission mechanism.

An embodiment of the invention is hereinafter explained in detail with reference to the accompany drawings. FIG. 1 shows a schematic configuration of a vehicle 1 including a control device 60 for a power transmission mechanism according to an embodiment of the invention. The vehicle 1 shown in the same drawing is a four-wheel-drive vehicle, including an engine 3 (power source) horizontally installed in a front part of the vehicle, an automatic transmission 4 disposed integrally with the engine 3, and a power transmission path 10 for transmitting power from the engine 3 to front wheels W1 and W2 and rear wheels W3 and W4.

An output shaft (not illustrated) of the engine 3 is connected to the left and right front wheels W1 and W2 as first driving wheels via the automatic transmission 4, a front differential 5 and left and right front drive shafts 6. Furthermore, the output shaft of the engine 3 is connected to the left and tight rear wheels W3 and W4 as second driving wheels via the automatic transmission 4, the front differential 5, a propeller shaft 7, a front-rear torque transmission mechanism 8 (power transmission mechanism), a rear differential 19, and left and right rear drive shafts 9.

In the front-rear torque transmission mechanism 8, a clutch 20 (power transmission element) for connecting/disconnecting the power transmission path from the propeller shaft 7 to the rear differential 19 is provided. The front-rear torque transmission mechanism 8 of the present embodiment is of a hydraulic type and is a mechanism for controlling an amount of power transmitted from the power transmission path 10 to the gear wheels W3 and W4. In addition, the clutch 20 of the present embodiment is a wet multiple disc clutch.

In addition, in the vehicle 1, a hydraulic circuit 30 and a control device 60 are provided, the hydraulic circuit 30 being for supplying operating oil to the clutch 20, the control device 60 having a four-wheel-drive electronic control unit (4WD•ECU) 50 (control section) for controlling oil pressure supplied by the hydraulic circuit 30 and various sensors. The various sensors include at least a velocity sensor VS (velocity information acquisition section) detecting a velocity of the vehicle 1, and an acceleration sensor AS (acceleration information acquisition section) detecting an acceleration, particularly forward and reverse acceleration, of the vehicle 1.

Moreover, acquisition of velocity information or acceleration information of the vehicle 1 is not necessarily performed by a sensor and may also be performed by means such as calculation. Hence, the "acquisition" of information is a concept covering not only detection but also calculation or estimation of information.

The 4WD•ECU 50 is composed of a microcomputer and so on. The 4WD•ECU 50 controls the oil pressure supplied by the hydraulic circuit 30, thereby controlling the power transmitted to the rear wheels W3 and W4 by the clutch 20. Accordingly, power control is performed using the front wheels W1 and W2 as the first driving wheels and the rear wheels W3 and W4 as the second driving wheels.

Based on detection by various detection means for detecting a traveling state of the vehicle 1, the 4WD•ECU 50 calculates the power distributed to the rear wheels W3 and W4 and a corresponding amount of oil pressure supplied to the clutch 20, as well as outputs a driving signal to the clutch 20 based on a result of the calculation. Accordingly, when the clutch 20 is released (disconnected), rotation of the propeller shaft 7 is not transmitted toward the rear differential 19, and the entire torque of the engine 3 is transmitted to the front wheels W1 and W2, which leads to a front-wheel-drive (2WD) state. On the other hand, when the clutch 20 is connected, the rotation of the propeller shaft 7 is transmitted toward the rear differential 19, thereby distributing the torque of the engine 3 to both the front wheels W1 and W2 and the rear wheels W3 and W4, which leads to a four-wheel-drive (4WD) state. On this occasion, by suitably controlling a fastening force of the clutch 20, the power distributed to the rear wheels W3 and W4 is controlled.

Figure 2:
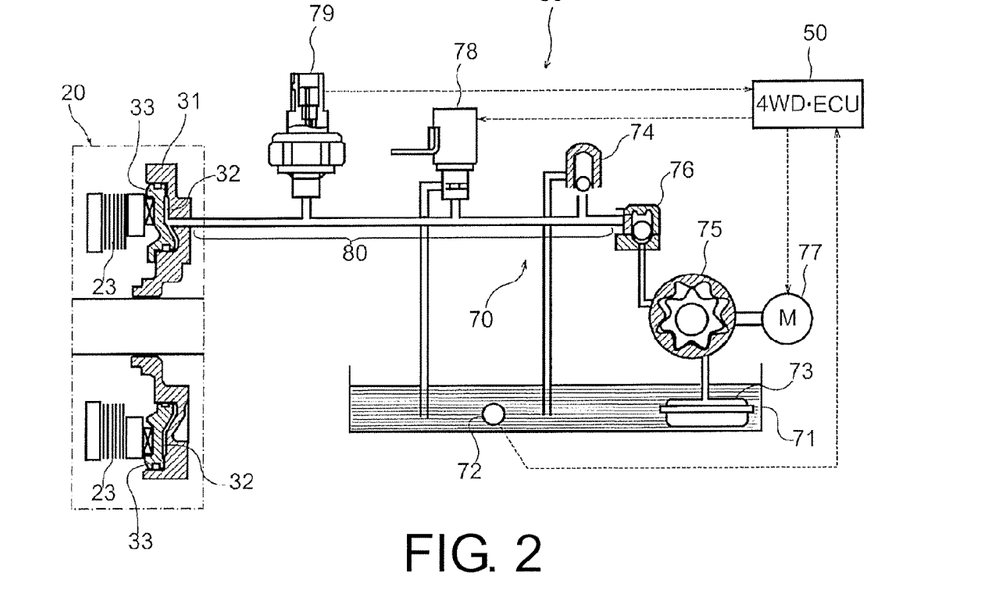
FIG. 2 is a hydraulic circuit diagram of a hydraulic circuit controlled by the control device for a power transmission mechanism.

FIG. 2 is a hydraulic circuit diagram of the hydraulic circuit 30 controlled by the control device 60. The hydraulic circuit 30 shown in the same drawing includes an electric oil pump 75 suctioning and pumping the operating oil stored in an oil tank 71 via a strainer 73, a motor 77 driving the oil pump 75, and an oil passage 70 communicating from the oil pump 75 to a piston chamber 32 of the clutch 20.

The clutch 20 includes a frictional engagement section 23 having a plurality of friction materials, a piston housing 31, and a cylinder piston 33 moving forward and backward inside the piston housing 31 to press the frictional engagement section 23. Inside the piston housing 31, a piston chamber 32 to which the operating oil is introduced is defined between the piston housing 31 and the cylinder piston 33. The cylinder piston 33 is arranged opposing one end of the plurality of friction materials of the frictional engagement section 23 in a lamination direction. Accordingly, the cylinder piston 33 presses the frictional engagement section 23 in the lamination direction of the friction materials by the oil pressure of the operating oil supplied to the piston chamber 32, thereby engaging the clutch 20 at a predetermined engagement pressure.

In the oil passage 70 communicating from the oil pump 75 to the piston chamber 32, a check valve 76, a relief valve 74, a solenoid valve 78 being a switching valve, and a hydraulic pressure sensor 79 are disposed in this order. The check valve 76 is configured to circulate the operating oil from the side of the oil pump 75 toward the side of the piston chamber 32, but to prevent circulation of the operating oil in an opposite direction. Accordingly, the operating oil fed to a downstream side of the check valve 76 by driving of the oil pump 75 can be contained in an oil passage 80 between the check valve 76 and the piston chamber 32. In this way, the check valve 76 is an operating oil sealing valve for sealing the operating oil in the oil passage 80 leading to the piston chamber 32 from the oil pump 75. A sealing type hydraulic circuit is composed of the oil passage 80 provided with the check valve 76 and the oil pump 75.

The relief valve 74 is a valve configured to open when pressure of the oil passage 80 between the check valve 76 and the piston chamber 32 exceeds a predetermined threshold value and rises abnormally, thereby discharging the operating oil to release oil pressure of the oil passage 80. The operating oil discharged from the relief valve 74 returns to the oil tank 71. The solenoid valve 78 is an on-off switching valve, capable of controlling opening and closing of the oil passage 80 by being pulse width modulation (PWM)-controlled based on commands of the 4WD•ECU 50. Accordingly, oil pressure of the piston chamber 32 can be controlled.

Moreover, the operating oil discharged from the oil passage 80 by opening the solenoid valve 78 returns to the oil tank 71. In addition, the hydraulic pressure sensor 79 is a hydraulic pressure detection means for detecting the oil pressure of the oil passage 80 and the piston chamber 32, and detected values thereof are sent to the 4WD•ECU 50. An oil temperature sensor 72 for detecting a temperature of the operating oil is provided inside the oil tank 71. A value detected by the oil temperature sensor 72 is sent to the 4WD•ECU 50.

In the present embodiment, the 4WD•ECU 50 fastens the clutch 20 when the vehicle 1 stops, so as to increase power transmission capacity of the clutch 20 after the vehicle 1 stops. The explanation for this is given below using diagrams.

Figure 3:
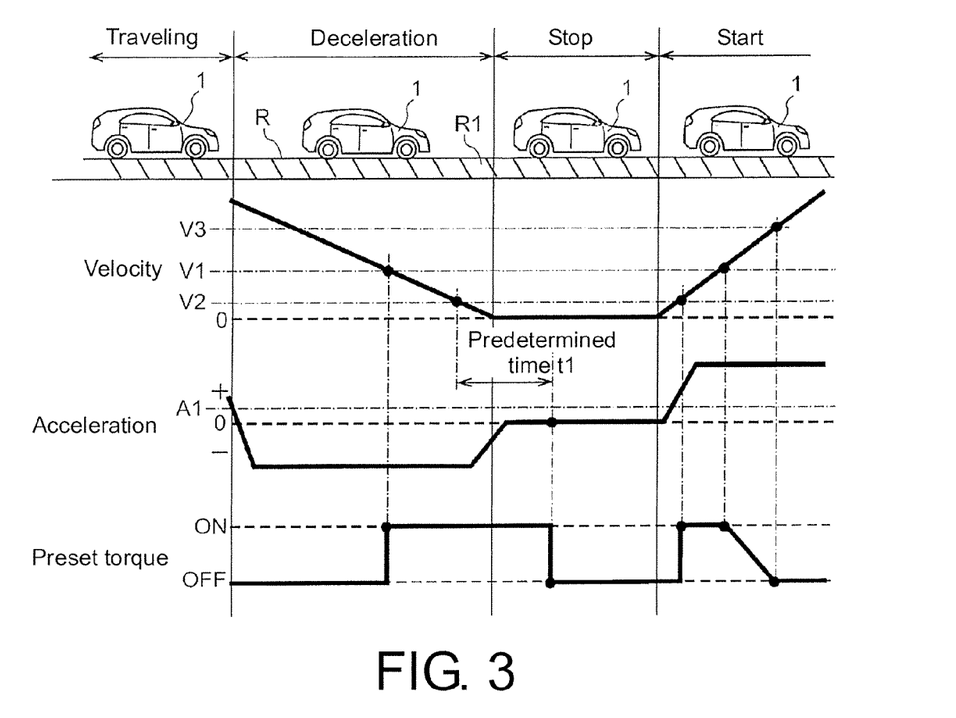
FIG. 3 shows a relationship between various sensors and states with and without preset torque on a level road.

FIG. 3 shows a relationship between various sensors and states with and without preset torque on a level road R1. In FIG. 3, velocity detected by the velocity sensor VS, acceleration detected by the acceleration sensor AS, and whether a command to input preset torque to the clutch 20 is issued from the 4WD•ECU 50 are shown.

In addition, in the present embodiment, predetermined values of the velocity sensor VS and the acceleration sensor AS for use by the 4WD•ECU 50 in determination are set in advance. Specifically, a vehicle velocity immediately before stop is set in advance as a first velocity V1, a vehicle velocity lower than the first velocity V1 is set in advance as a second velocity V2, and a predetermined backward acceleration is set in advance as a threshold acceleration A1.

On the level road R1, as shown in FIG. 3, the vehicle 1 decelerates. When a value of the velocity sensor VS becomes equal to or less than the first velocity V1 when the vehicle 1 decelerates, it is known that the vehicle 1 is about to stop. At this moment, in order to generate preset torque in the clutch 20, the 4WD•ECU 50 issues to the hydraulic circuit 30 a command to fasten the clutch 20.

In a state in which the preset torque is generated, i.e., a preset torque ON state, when the value of the velocity sensor VS becomes the second velocity V2 lower than the first velocity V1, a counter (not illustrated) in the 4WD•ECU 50 measures a predetermined time t1. Then, after the predetermined time t1 has passed, the 4WD•ECU 50 determines a value of the acceleration sensor AS.

Herein, the predetermined time t1 is a period of time until a command to cancel the preset torque is issued. It is not particularly limited, but may be set to a period of time from when the second velocity V2 is reached, i.e., immediately before the vehicle 1 stops, to immediately after the vehicle 1 stops, considerably near when the second velocity V2 is reached. By setting the predetermined time t1 in this way, on the level road R1, the preset torque is canceled by the clutch 20 immediately after the vehicle 1 stops, and power consumption in stopping the vehicle 1 can thus be suppressed.

At this moment, when the vehicle 1 stops on the level road R1, the acceleration acting on the vehicle 1 is small, and great driving torque is rarely required when starting the vehicle 1. In this way, if there is little need to increase the power transmission capacity of the clutch 20 in advance, the 4WD•ECU 50 cancels the preset torque, i.e., turns OFF the preset torque. Specifically, when the 4WD•ECU 50 determines that the value of the acceleration sensor AS is equal to or less than the threshold acceleration A1 after the predetermined time t1 has passed, the 4WD•ECU 50 unfastens the clutch 20.

In starting the vehicle 1, first of all, when the vehicle velocity becomes the second velocity V2, the preset torque is turned ON, and the vehicle 1 is started using the front wheels W1 and W2 and the rear wheels W3 and W4. When the vehicle velocity becomes the first velocity V1, the preset torque is gradually reduced; when the vehicle velocity becomes a third velocity V3 higher than the first velocity V1, the preset torque is turned OFF. According to this, the first velocity V1 and the second velocity V2 can be utilized as parameters for determining ON/OFF of the preset torque.

Figure 4:
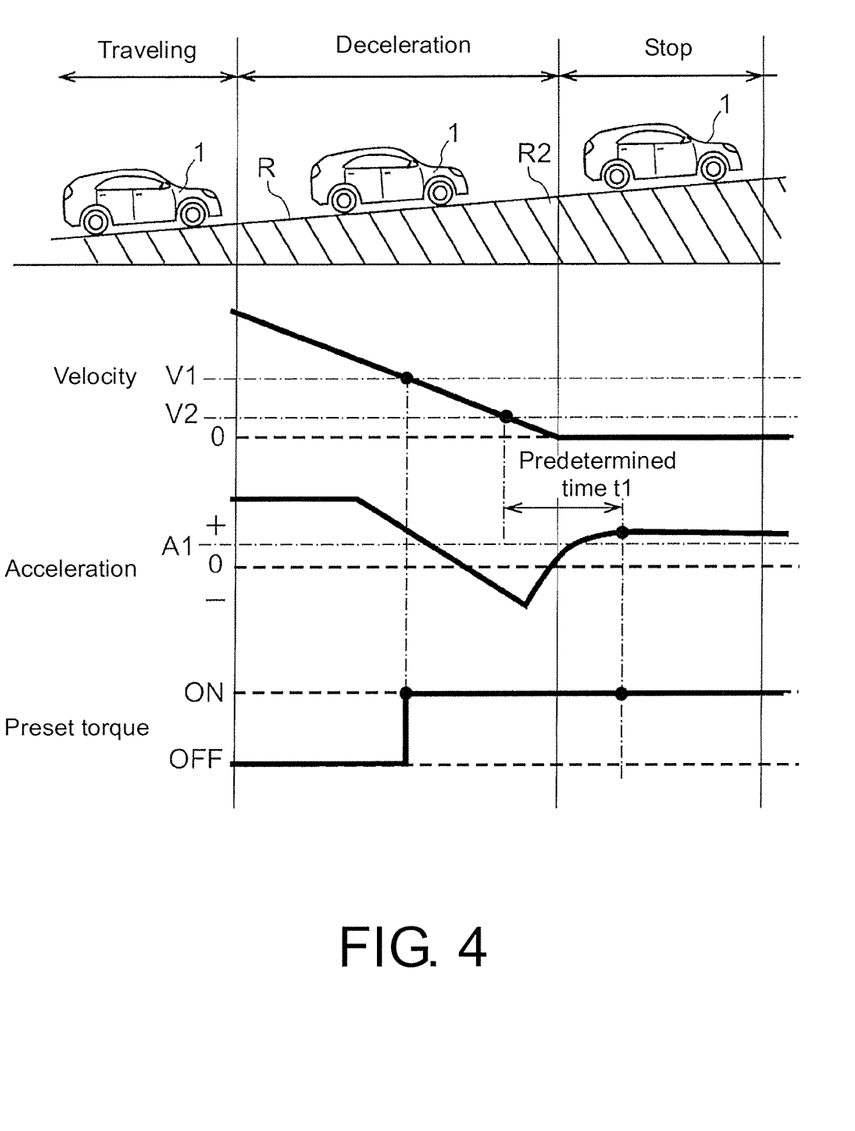
FIG. 4 shows a relationship between various sensors and states with and without the preset torque on an uphill road.

FIG. 4 shows a relationship between various sensors and states with and without the preset torque on an uphill road R2. The control when the vehicle 1 is started on the uphill road R2 is the same as that on the above-mentioned level road R1, and an explanation thereof is thus omitted.

On the uphill road R2, as shown in FIG. 4, the vehicle 1 decelerates. When the value of the velocity sensor VS becomes equal to or less than the first velocity V1 when the vehicle 1 decelerates, it is known that the vehicle 1 is about to stop. At this moment, in order to generate the preset torque in the clutch 20, the 4WD•ECU 50 issues to the hydraulic circuit 30 a command to fasten the clutch 20.

In the preset torque ON state, when the value of the velocity sensor VS becomes the second velocity V2 lower than the first velocity V1, the counter (not illustrated) in the 4WD•ECU 50 measures the predetermined time t1. Then, after the predetermined time t1 has passed, the 4WD•ECU 50 determines the value of the acceleration sensor AS.

At this moment, when the vehicle 1 stops on the uphill road R2, the acceleration acting on the vehicle 1 is great, and great driving torque is required when starting the vehicle 1. In this way, if there is a need to increase the power transmission capacity of the clutch 20 in advance, the 4WD•ECU 50 keeps increasing the power transmission capacity, i.e., maintains the preset torque ON state. Specifically, when the 4WD•ECU 50 determines that the value of the acceleration sensor AS is neither equal to nor less than the threshold acceleration A1 after the predetermined time t1 has passed, the 4WD•ECU 50 maintains the fastened state of the clutch 20.

Figure 5:
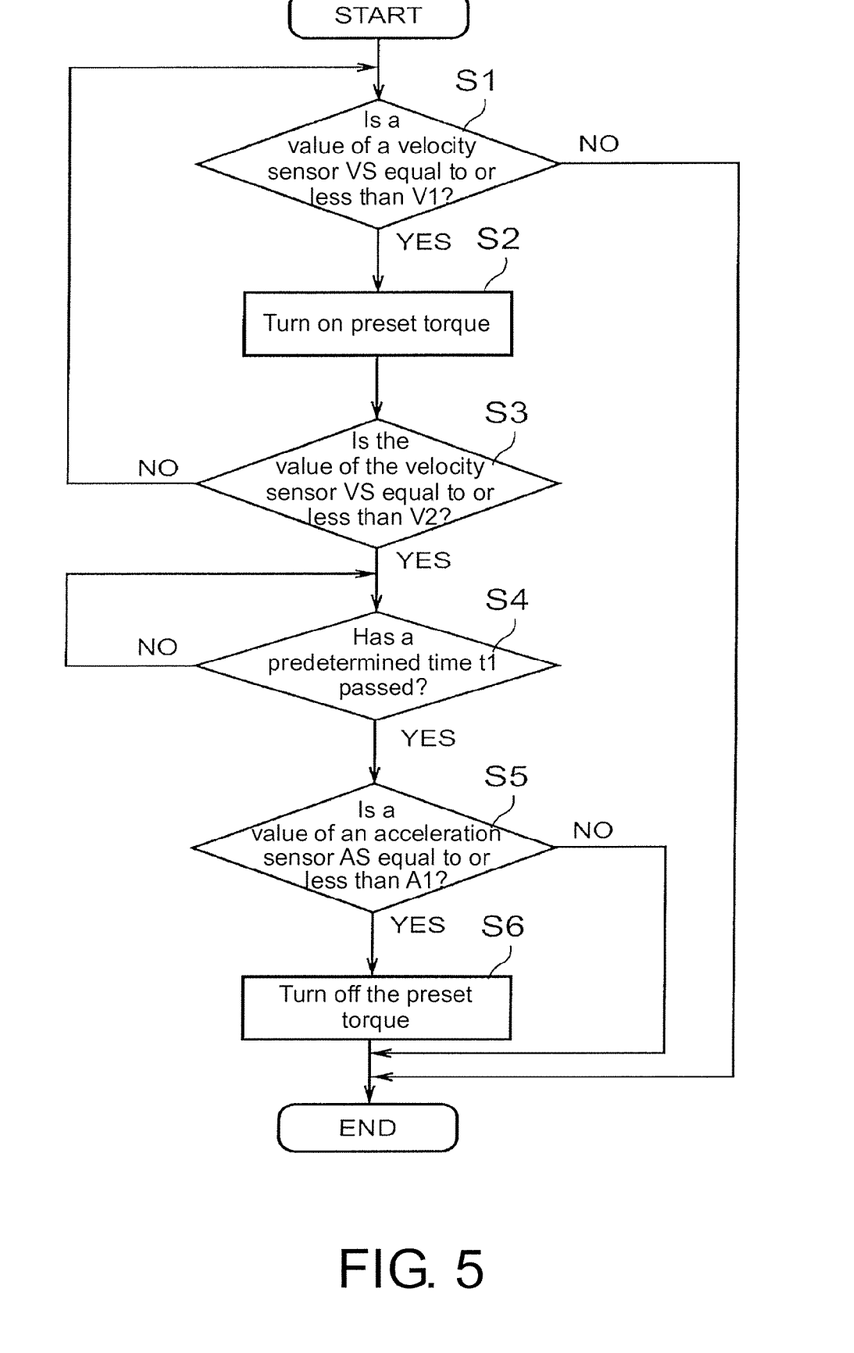
FIG. 5 is a flowchart showing a control when the vehicle stops.

FIG. 5 is a flowchart showing a control when the vehicle stops. A control procedure of the control device 60 is explained using diagrams. First of all, when the vehicle 1 decelerates, the 4WD•ECU 50 determines whether the value of the velocity sensor VS is equal to or less than the first velocity V1 (step S1).

In step S1, if the value of the velocity sensor VS is equal to or less than the first velocity V1, the preset torque is turned ON (step S2). On the other hand, if the value of the velocity sensor VS is neither equal to nor lower than the first velocity V1, the control of the preset torque is not performed.

Next, the value of the velocity sensor VS is further subjected to determination (step S3), and if the value of the velocity sensor VS is equal to or less than the second velocity V2, the 4WD•ECU 50 waits for passage of the predetermined time t1 (step S4). Then, whether the value of the acceleration sensor AS is equal to or less than the threshold acceleration A1 is determined (step S5).

In step S5, if the value of the acceleration sensor AS is equal to or less than the threshold acceleration A1, the state of the preset torque is changed to OFF (step S6). On the other hand, if the value of the acceleration sensor AS is neither equal to nor less than the threshold acceleration A1, the control of changing the state of the preset torque is not performed. In this case, the preset torque is maintained in the ON state.

As explained above, according to the control device 60 for a power transmission mechanism of the present embodiment, when it is acquired that the vehicle 1 transitions from the traveling state to the stop state, the acquisition triggers an increase in power transmission capacity. Accordingly, on a slope or the like where power is required in starting the vehicle 1, the driving wheels can reliably obtain power immediately after the start of the vehicle 1.

In addition, the control device 60 for a power transmission mechanism is characterized by including the velocity sensor VS acquiring velocity information of the vehicle 1, wherein when the vehicle 1 decelerates, if the velocity sensor VS acquires a velocity equal to or less than the first velocity V1, the clutch 20 is fastened. In this way, by performing control using the velocity of the vehicle 1 as a parameter, the control becomes easy.

In addition, the control device 60 for a power transmission mechanism is characterized by including the acceleration sensor AS acquiring acceleration information of the vehicle 1, wherein when the 4WD•ECU 50 acquires that the value of the acceleration sensor AS is equal to or less than the threshold acceleration A1 after the predetermined time t1 has passed since the velocity sensor VS acquires the second velocity V2 lower than the first velocity V1, the clutch 20 is unfastened.

In this way, by setting the second velocity V2 as a vehicle velocity immediately before stop, and acquiring an acceleration equal to or less than the threshold acceleration A1 after the predetermined time t1 has passed since the second velocity V2 is reached, an acceleration value in the state immediately after stop can be acquired. In addition, when the value of the acceleration sensor AS is equal to or less than the threshold acceleration A1, by unfastening the clutch 20, the power transmission capacity is suppressed from being increased more than necessary.

In addition, in the control device 60 for a power transmission mechanism, the clutch 20 is configured to be fastened or unfastened by the oil pressure of the operating oil supplied from the hydraulic circuit 30, and the 4WD•ECU 50 controls the oil pressure supplied from the hydraulic circuit 30 to the clutch 20.

Herein, when the clutch 20 is operated using the hydraulic circuit 30, after the vehicle 1 stops, even if the 4WD•ECU 50 issues to the hydraulic circuit 30 a command to generate driving torque to fasten the clutch 20, hydraulic responsiveness remains increasing. That is, when the vehicle 1 is started, since differential rotation occurs in the power transmission path 10 in order to transmit the driving torque, transmission responsiveness of the driving torque is somewhat delayed.

However, according to the above configuration in the present embodiment, even if the clutch 20 is operated using the hydraulic circuit 30, it is possible to increase the power transmission capacity of the clutch 20 before the vehicle 1 stops. Hence, on a slope or the like where power is required in starting the vehicle 1, the driving wheels can reliably obtain power immediately after the start of the vehicle 1.

The above has explained an embodiment of the invention. However, the invention is not limited to the above embodiment, and can be transformed in various ways within the scope of technical ideas of the invention as described in the claims, specification and drawings. Particularly, although the vehicle of the present embodiment is a four-wheel-drive (4WD) vehicle, an all-wheel-drive (AWD) vehicle is applicable if having a power transmission mechanism distributing power to the front and the rear.

In addition, although control is performed using the velocity of the vehicle 1 as a parameter in the above embodiment, the invention is not limited thereto. For example, when the 4WD•ECU 50 acquires that an inclination of a road surface R is equal to or greater than a predetermined value, the 4WD•ECU 50 performs control to inhibit unfastening of the clutch 20. Or, when the 4WD•ECU 50 acquires that the road surface R in front of the vehicle 1 inclines so as to be higher by a predetermined value or more than the road surface R behind the vehicle 1, the 4WD•ECU 50 performs control to inhibit unfastening of the clutch 20.

In this way, road surface inclination information can also be used as a parameter for the control relating to fastening of the clutch 20. Moreover, a method for acquiring the road surface inclination information is not particularly limited, but various methods such as acquiring a value of an inclinometer attached to the vehicle and so on may be used.

What is claimed is:

1. A control device for a power transmission mechanism of a vehicle, the vehicle having a power transmission mechanism that comprises a power transmission path transmitting power from a power source to a first driving wheel and a second driving wheel, and a power transmission element arranged in the power transmission path between the power source and the second driving wheel, the control device comprising: a control section, controlling a fastening force of the power transmission element so as to control power transmission capacity of the power transmission mechanism from the power source to the second driving wheel, wherein when the control section acquires that the vehicle transitions from a traveling state to a stop state, the acquisition triggers the control section to increase the power transmission capacity.

2. The control device for a power transmission mechanism according to claim 1, comprising:

a velocity information acquisition section, acquiring velocity information of the vehicle, wherein when the velocity information acquisition section acquires a velocity equal to or less than a first velocity when the vehicle decelerates, the control device fastens the power transmission element.

3. The control device for a power transmission mechanism according to claim 2, comprising:

an acceleration information acquisition section, acquiring acceleration information of the vehicle, wherein when the control section acquires that a value of the acceleration information acquisition section is equal to or less than a threshold acceleration after a predetermined time has passed since the velocity information acquisition section acquires a second velocity lower than the first velocity, the control section unfastens the power transmission element.

4. The control device for a power transmission mechanism according to claim 3, wherein the power transmission element is configured to be fastened or unfastened by oil pressure of operating oil supplied from a hydraulic circuit; and the control section controls the oil pressure supplied from the hydraulic circuit to the power transmission element.

5. The control device for a power transmission mechanism according to claim 3, wherein when the control section acquires that an inclination of a road surface is equal to or greater than a predetermined value, the control section performs control to inhibit the unfastening of the power transmission mechanism.

6. The control device for a power transmission mechanism according to claim 5, wherein when the control section acquires that the road surface in front of the vehicle inclines so as to be higher by a predetermined value or more than the road surface behind the vehicle, the control section inhibits the unfastening of the power transmission mechanism.

7. The control device for a power transmission mechanism according to claim 2, wherein the power transmission element is configured to be fastened or unfastened by oil pressure of operating oil supplied from a hydraulic circuit; and the control section controls the oil pressure supplied from the hydraulic circuit to the power transmission element.

8. The control device for a power transmission mechanism according to claim 1, wherein the power transmission element is configured to be fastened or unfastened by oil pressure of operating oil supplied from a hydraulic circuit; and the control section controls the oil pressure supplied from the hydraulic circuit to the power transmission element.

* * * * *